US012169816B2

(12) United States Patent
Carroll

(10) Patent No.: US 12,169,816 B2
(45) Date of Patent: *Dec. 17, 2024

(54) AUTOMATED TRANSACTION PROCESSING BASED ON COGNITIVE LEARNING

(71) Applicant: Bank of America Corporation, Charlotte, NC (US)

(72) Inventor: Matthew E. Carroll, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 210 days.

This patent is subject to a terminal disclaimer.

(21) Appl. No.: 17/900,416

(22) Filed: Aug. 31, 2022

(65) Prior Publication Data

US 2022/0414624 A1 Dec. 29, 2022

Related U.S. Application Data

(63) Continuation of application No. 16/821,117, filed on Mar. 17, 2020, now Pat. No. 11,468,415.

(51) Int. Cl.
*G06Q 40/00* (2023.01)
*G06F 9/50* (2006.01)
*G06N 20/00* (2019.01)
*G06Q 20/10* (2012.01)

(52) U.S. Cl.
CPC ........... *G06Q 20/10* (2013.01); *G06F 9/5083* (2013.01); *G06N 20/00* (2019.01)

(58) Field of Classification Search
CPC ....... G06Q 20/10; G06N 20/00; G06F 9/5083
See application file for complete search history.

(56) References Cited

U.S. PATENT DOCUMENTS

| 3,646,274 A | 2/1972 | Nadir et al. |
| 4,788,679 A | 11/1988 | Kataoka et al. |
| 6,856,970 B1 | 2/2005 | Campbell et al. |
| 7,587,363 B2 | 9/2009 | Cataline et al. |

(Continued)

FOREIGN PATENT DOCUMENTS

| CN | 110245935 A | * | 9/2019 | ............. G06N 3/088 |
| WO | 9858356 A2 | | 12/1998 | |

(Continued)

OTHER PUBLICATIONS

Badran, "Money Transfer Services," Master of Science in Banking and Finance, Eastern Mediterranean University, 2009. (Year: 2009).*

(Continued)

*Primary Examiner* — Abhishek Vyas
*Assistant Examiner* — William B. Bunker
(74) *Attorney, Agent, or Firm* — Banner & Witcoff, Ltd.

(57) ABSTRACT

Aspects of the disclosure relate to systems for processing transactions between two entities. A transaction control platform may determine attributes associated with different transfer channels between the two entities. Based on the determined attributes, the transaction control platform may determine a transfer channel to be used for transmitting a message corresponding to the transaction. The transaction control platform may use machine learning algorithms to identify an optimal transfer channel that meets particular desired factors.

21 Claims, 8 Drawing Sheets

(56) References Cited

U.S. PATENT DOCUMENTS

| | | | |
|---|---|---|---|
| 8,156,040 B2* | 4/2012 | Gavin | G06Q 40/00 |
| | | | 705/35 |
| 8,458,091 B2 | 6/2013 | Babu | |
| 8,612,345 B2 | 12/2013 | Lecuyer et al. | |
| 8,973,001 B2 | 3/2015 | Russell | |
| 10,783,502 B2 | 9/2020 | Michelsen et al. | |
| 2002/0116331 A1 | 8/2002 | Cataline et al. | |
| 2003/0208440 A1 | 11/2003 | Harada et al. | |
| 2007/0005498 A1 | 1/2007 | Cataline et al. | |
| 2007/0100748 A1 | 5/2007 | Dheer et al. | |
| 2007/0124242 A1* | 5/2007 | Reis, Jr. | G06Q 20/10 |
| | | | 705/39 |
| 2009/0011920 A1 | 1/2009 | Champion et al. | |
| 2009/0119209 A1 | 5/2009 | Sorensen et al. | |
| 2009/0248574 A1 | 10/2009 | Leung et al. | |
| 2009/0276359 A1* | 11/2009 | Panthaki | G06Q 20/40 |
| | | | 705/44 |
| 2010/0021149 A1 | 1/2010 | Mulder et al. | |
| 2010/0211495 A1 | 8/2010 | Zanzot et al. | |
| 2010/0211499 A1 | 8/2010 | Zanzot et al. | |
| 2015/0015457 A1 | 1/2015 | Takasu et al. | |
| 2015/0154570 A1 | 6/2015 | Dheer | |
| 2016/0008779 A1 | 1/2016 | Seaward et al. | |
| 2017/0364878 A1* | 12/2017 | Malhotra | G06Q 20/3221 |
| 2018/0015983 A1 | 1/2018 | Schueller | |
| 2018/0028785 A1 | 2/2018 | Simmons et al. | |
| 2019/0325410 A1 | 10/2019 | Sabet et al. | |
| 2019/0340583 A1 | 11/2019 | Dubinsky et al. | |
| 2019/0342205 A1 | 11/2019 | Ur et al. | |
| 2019/0379595 A1 | 12/2019 | Ur et al. | |
| 2020/0097955 A1* | 3/2020 | Gandhi | G06N 3/08 |
| 2020/0356964 A1* | 11/2020 | Xu | G06N 3/088 |
| 2021/0018281 A1 | 1/2021 | Grohmann et al. | |
| 2021/0042712 A1 | 2/2021 | Crowley et al. | |
| 2021/0182810 A1 | 6/2021 | Johnston et al. | |

FOREIGN PATENT DOCUMENTS

| | | | | |
|---|---|---|---|---|
| WO | WO-2012120011 A1 * | 9/2012 | | G06Q 20/0655 |
| WO | WO-2019172489 A1 * | 9/2019 | | G06Q 20/10 |

OTHER PUBLICATIONS

Chapter 2, "Understanding Remittances: Demography, Transaction Channels, and Regulatory Aspects," International Transactions In Remittances: Guide For Compilers And Users, International Monetary Fund, 2009 (Year: 2009).*

Xia et al., "Secure Payment Routing Protocol for Economic Systems Based on Blockchain," Workshop on Computing, Networking and Communications (CNC), 2018 (Year: 2018).*

Fundamentals of Global Payment Systems and Practices, www.treasuryaliance.com, 24 pages, 2018 Treasury Alliance Group llc.

* cited by examiner

AUTOMATED TRANSACTION PROCESSING BASED ON COGNITIVE LEARNING

CROSS REFERENCE TO RELATED APPLICATIONS

This application is a continuation of and claims priority to patent application Ser. No. 16/821,117 entitled "Using Cognitive Automation to Monitor Payment Processing" filed on Mar. 17, 2020, which is incorporated by reference in its entirety.

TECHNICAL FIELD

This disclosure generally pertains to message transmission systems for transaction processing and more specifically to using automation to monitor and select a transaction channel.

BACKGROUND

A transaction sometimes involves transfer of value, in the form of money, between two entities. The transaction may be processed based on transmission of a message from one entity to another. For example, a computing platform associated with a payer's financial institution may transmit, to a computing platform associated with a transfer channel, a message indicating a request to process a fund transfer via the transfer channel. A backlog on one transfer channel may necessitate a manual intervention, for example, to select a new transfer for the fund transfer. This may be inefficient in light of a large number of factors that may need to be accounted for selecting a new transfer channel and determining a necessity for changing the transfer channel. Meanwhile, advances in machine learning promise to enable the automated processing of problems formerly limited to human intervention. Machine learning may be used to allow a computer to perform the same or similar tasks without being explicitly programmed to do so. Machines may also learn and identify correlations in data that would otherwise go undetected if reviewed by humans. However, much of the aforementioned process continues to be handles in a manual and laborious process, thus leaving much to be desired in the art.

SUMMARY

The following summary presents a simplified summary of certain features. The summary is not an extensive overview and is not intended to identify key or critical elements.

In one embodiment, a transaction processing system is disclosed comprising: (i) a transaction input device; and (ii) a transaction control platform. The transaction input device may be configured to transmit a first message to a first computing platform associated with a first transfer channel among available transfer channels. The first message may indicate a first request to process a fund transfer. The transaction control platform may comprise at least one processor, a communication interface communicatively coupled to the at least one processor, and a memory storing computer-readable instructions that, when executed by the at least one processor, cause the transaction control platform to perform one or more steps. For example, the steps may comprise to: determine respective attributes of the available transfer channels; determine a second transfer channel among the available transfer channels based on the determined attributes and the first message; and transmit a second message indicating a second request to process the fund transfer via the communication interface and to a second computing platform associated with the second transfer channel.

Furthermore, in some examples, the first message may indicate at least one selected from: a destination user account for the fund transfer; an intermediary account for the fund transfer; the first transfer channel; a payment system associated with the first transfer channel; origin currency associated with the fund transfer; destination currency associated with the fund transfer; a cut-off time associated with the fund transfer; a value of the fund transfer; and combination thereof. Moreover, in one example, the respective attributes of the available transfer channels may comprise at least one selected from: lengths of respective system queues; respective usage costs; respective average wait times for completing fund transfers; respective average times for receiving handshake signals; and combination thereof.

In some embodiments, a method is disclosed for signal transmissions in a transaction control platform comprising at least one processor, a communication interface, and memory. The method may comprise one or more steps including, but not limited to, receiving a first message indicating a first request to process a fund transfer via a first transfer channel; determining respective attributes of available transfer channels; determining a second transfer channel among the available transfer channels based on the determined attributes and the first message; and transmitting a third message indicating a request to cancel the first request to process the fund transfer, via the communication interface and to a first computing platform associated with the first transfer channel; and transmitting a second message indicating a second request to process the fund transfer, via the communication interface and to a computing platform associated with the second transfer channel. One or more aspects of the aforementioned may be optional and/or performed in a different order than recited herein. In addition, an apparatus is disclosed comprising at least one processor, a communication interface communicatively coupled to the at least one processor, and a memory storing computer-readable instructions that, when executed by the at least one processor, cause the apparatus to one or more steps of a method disclosed herein.

These and other features and advantages are described in more detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
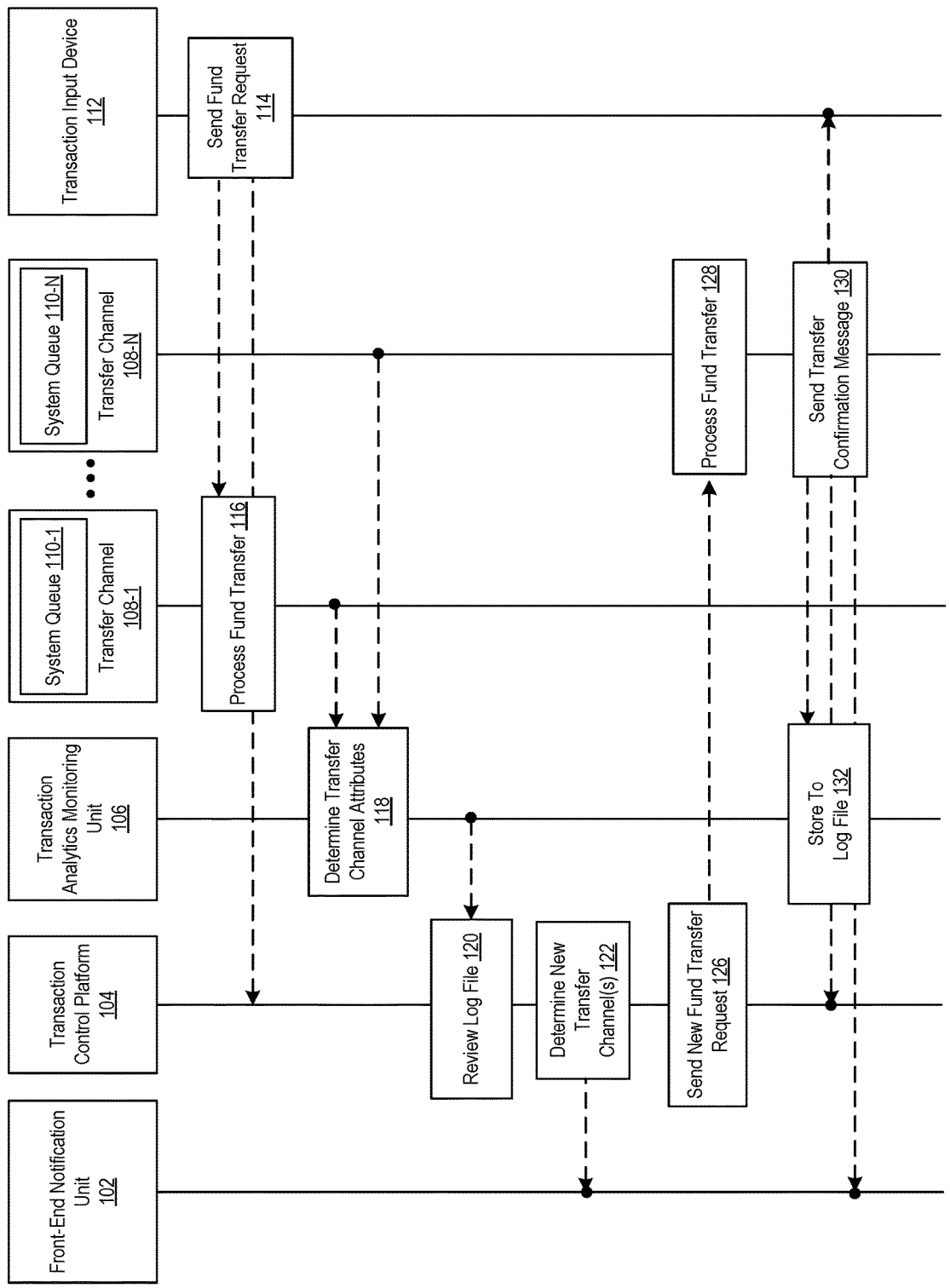
FIG. 1 shows an illustrative event sequence for a fund transfer between two entities in accordance with one or more examples described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Aspects of this disclosure relate to transmission of messages for transferring funds between two financial entities (e.g., banks). A user input device may send a first message indicating a first request to process a fund transfer to a destination user account via a first transfer channel among available transfer channels. A decision platform may determine respective attributes of available transfer channels and select, based on the determined attributes and the first message, a second transfer channel among the available transfer channels. The decision platform may send, via the second communication interface and to a second computing platform associated with the second transfer channel, a third message indicating a second request process the fund transfer.

Electronic fund transfer is a convenient method to send funds to another account. A payer may instruct the payer's bank (e.g., using a user device) to transfer funds to a payee's bank and into an account associated with the payee. Based on the instructions, a message indicating a request for a fund transfer, along with information associated with the fund transfer, may be sent to a computing platform associated with a transfer channel. The computing platform may, based on the information, process the fund transfer (e.g., to the destination account or to an intermediary account). However, in many cases, the fund transfer may be delayed. For example, a time for completion of the fund transfer may exceed a cut-off time as included in the payer instructions. In another example, a transaction may fail due to failure of the transfer channel and/or the computing platform. Delay and/or failure in completion of a fund transfer may result in reduced payer satisfaction.

A plurality of transfer channels may be available between the payer's bank and the payee's bank. A transfer channel, among the plurality of transfer channel, may be determined based on transaction details associated with the fund transfer, real-time attributes associated with the various transfer channels, and/or historical record associated with prior fund transfers. A transaction control platform may determine (e.g., based on machine learning techniques) a transfer channel to be used for the fund transfer. The transaction control platform may monitor a status of the fund transfer/transfer channel in real-time to determine potential delay or failure of the fund transfer. The transaction control platform may determine another transfer channel, for example, if the transaction control platform determines that the fund transfer may be delayed, and process the fund transfer using the new transfer channel. Using the transaction control platform for determination of a transfer channel and for real-time monitoring and switching of the transfer channel may ensure a successful transfer of funds.

Currently many payment systems are in use for processing domestic or international fund transfers. Some examples of payment systems include paper-based systems (e.g., check-based or draft based), electronic fund transfer (EFT)/automated clearing house (ACH) systems, real time gross settlement (RTGS) systems, Society for Worldwide Interbank Financial Telecommunication (SWIFT) system, credit card-based systems, etc. A transfer channel for a fund transfer between two accounts may comprise one or more payment systems. For example, funds may be transferred from account A to account B using an ACH system to transfer funds from account A to an intermediary account, and using a SWIFT system to transfer the funds from the intermediary account to account B. A transfer channel for a fund transfer between two accounts may comprise one or more currency conversion steps between a source account and a destination account.

FIG. 1 shows an illustrative event sequence for a fund transfer between two entities in accordance with one or more examples described herein. The entities may be for example a payer's bank and a payee's bank. A plurality of transfer channels 108 may be used for fund transfer between the payer's bank and the payee's bank. Each transfer channel 108 may comprise one or more computing platforms connecting the payer's bank and the payee's bank. Each transfer channel 108 may be associated with a corresponding system queue 110 comprising one or more fund transfer requests. The transfer channel 108 may process the fund transfer requests in an order specified by the system queue 110.

At step 114, a transaction input device 112 may send (e.g., transmit) a fund transfer request to a transfer channel 108-1 (e.g., to a computing platform associated with the transfer channel 108-1) and/or to a transaction control platform 104. The computing platform may be associated with the payee's bank or an intermediary entity (e.g., an intermediary bank, financial entity, etc.).

The fund transfer request may comprise transaction details associated with a transfer of funds from the payer's bank to the payee's bank (e.g., as input by a user of the transaction input device). The transaction details may comprise indications of one or more of: a source account, a destination account, intermediary account(s), a value of funds to be transferred, an origin currency, a destination currency, a transaction type, and/or a transaction structure. The transaction type may indicate one or more payment systems to be used for the fund transfer (e.g., ACH system, RTGS system, SWIFT network, etc.). For example, the transaction type may indicate that the transfer channel 108-1 is to be used for the fund transfer. The transaction structure may indicate a time associated with the fund transfer (e.g., a time of initiation of the fund transfer, a cut-off time associated with the fund transfer, etc.). The cut-off time may be a time by which the transfer of funds must be completed or a time duration within which the transfer of funds must be completed.

At step 116, the transfer channel 108-1 may process the fund transfer to the destination account. In an example, the computing platform associated with the transfer channel 108-1 may process the fund transfer. The computing platform may be associated with the payee's bank or an intermediary entity (e.g., an intermediary bank, financial entity, etc.). The computing platform may process the fund transfer to the intermediary account and/or the destination account based on the fund transfer request.

At step 118, a transaction analytics monitoring unit 106 may determine attributes associated with the transfer channels 108. The transaction analytics monitoring unit 106 may monitor/determine one or more of: lengths of respective system queues 110 associated with the respective transfer channels 108, respective rates of completion of fund transfers in the respective transfer channels 108, respective usage costs associated with the respective transfer channels 108, respective average wait times for completing fund transfers over the respective transfer channels 108, respective average wait times associated with receiving handshake signals from computing platforms in the respective transfer channels 108, respective currencies involved in the respective transfer channels 108, respective exchange rates of currencies corresponding to the respective transfer channels 108, respective countries/entities corresponding to the respective transfer channels 108, etc. The transaction monitoring unit 106 may monitor statuses of handshake signals transmitted by different computing platforms in the transfer channels 108. The transaction analytics monitoring unit 106 may store the determined attributes in a log file and periodically update the determined attributes based on the monitoring.

At step 122, the transaction control platform 104 may determine a new transfer channel for the transfer of funds, among the available transfer channel, based on the determined attributes associated with the transfer channels 108 and/or the transaction details. The transaction control platform 104 may determine the new transfer channel, for example, based on reviewing the log file (e.g., at step 120). The transaction control platform 104 may determine the new transfer channel based on a machine learning algorithm. The transaction control platform 104 may determine the new transfer channel based on a least cost routing (LCR) algorithm as described herein. The new transfer channel may be associated with a higher tier service level (e.g., a lower average wait time for completing a fund transfer) than the transfer channel 108-1. Determining the new transfer channel may comprise determining one or more payment systems and/or intermediary accounts for the fund transfer between the source account and the destination account. The transaction control platform 104 may correspond to (e.g., operated by the payer's bank) or may be centralized system that may be used to control fund transfer operations across multiple entities (e.g., banks, financial entities).

The transaction control platform 104 may determine the new transfer channel, for example, if the transaction control platform 104 determines that the fund transfer, based on the fund transfer request, is delayed or failed. The transaction control platform may determine (e.g., using determined attributes of the transfer channel 108-1, a machine learning algorithm, historical data associated with fund transfers over the transfer channel 108-1, etc.) an expected wait time for completing the fund transfer over the transfer channel 108-1, threshold length of the system queue 110-1, an expected handshake wait time associated with the transfer channel 108-1, and/or a threshold time associated with the transfer channel, and use one or more of these measures to determine that the fund transfer is delayed or failed. The transaction analytics monitoring unit 106 may store attributes associated with the delayed/failed fund transfer (e.g., the source user account, the destination user account, the transfer channel 108-1, etc.) in the log file. The transaction control platform 104 may use the stored attributes for determining transfer channels for future fund transfer requests. The transaction control platform 104, for example, may refrain from selecting the transfer channel 108-1 for future fund transfer requests.

The transaction control platform 104 may determine the new transfer channel, for example, if the expected wait time exceeds the cut-off time. The transaction control platform 104 may determine the new transfer channel, for example, if a length of the system queue 110-1 exceeds a threshold queue length. The transaction control platform 104 may determine the new transfer channel, for example, if a difference between the cut-off time and an elapsed time following the sending of the fund transfer request is less than a threshold time. The threshold may be an average time period between transmissions of prior fund transfer requests and receptions of transfer confirmation messages from the computing platform associated with the transfer channel 108-1.

The transaction control platform 104 may determine the new transfer channel, for example, if the transaction input device 112 determines that the transfer channel 108-1 is non-operational. The transaction control platform 104 may determine that the transfer channel 108-1 is non-operational if the transaction control platform 104 does not receive a handshake signal, from the computing platform associated with the transfer channel 108-1, responsive to the fund transfer request. The transaction control platform 104 may determine that the transfer channel 108-1 is non-operational if the transaction control platform 104 does not receive the handshake signal within an expected handshake wait time associated with the transfer channel 108-1.

In one example, a transfer channel 108-1 may comprise two payment systems. The transaction input device 112 may send a first fund transfer request to a first computing platform for transferring funds, from the source account, to an intermediary account using a first payment system. The transaction input device 112 may send a second fund transfer request to a second computing platform for transferring funds, from the intermediary account, to the destination account using a second payment system. The transaction control platform 104 may determine that the transfer channel 108-1 is non-operational if the transaction control platform 104 does not receive (e.g., within an expected handshake wait time) a handshake signal, from the first (or second) computing platform, responsive to the first (or second) fund transfer request.

The transaction control platform 104 may determine the new transfer channel based on respective usage costs associated with the respective transfer channels 108. The transaction control platform 104 may determine the new transfer channel, for example, based on determining that a sum of a cost associated with a delayed fund transfer (e.g., as owed to the payer) and a usage cost associated with the transfer channel 108-1 exceeds a cost associated with using the new transfer channel. The transaction control platform 104 may determine the new transfer channel, for example, if the usage cost associated with the transfer channel 108-1 is higher than a usage cost associated with the new transfer channel.

A length of a system queue associated with the new transfer channel may be smaller than the length of the system queue 110-1 associated with the transfer channel 108-1. An expected wait time associated with the new transfer channel may be smaller than the expected wait time for the fund transfer over the transfer channel 108-1. In an example, the transaction control platform 104 may determine transfer channel 108-N as the new transfer channel based on one or more of the above considerations.

In an example, the transaction control platform 104 determine a set of potential new transfer channels for the fund transfer based on the determined attributes associated with the transfer channels 108 and/or the transaction details. The transaction control platform 104 may send the set of potential new transfer channels to the front-end notification unit 102 for user review. The user may use the front-end notification unit 102 to access the log file data. In an example, the user may select the transfer channel 108-N as the new transfer channel from the set of potential new transfer channels. The front-end notification unit 102 may send the indication of the new transfer channel 108-N to the transaction control platform 104.

At step 126, the transaction control platform may send a new fund transfer request to the transfer channel 108-N (e.g., to a computing platform associated with the transfer channel 108-N). The new fund transfer request may comprise the transaction details associated with the transfer of funds from the payer's bank to the payee's bank. The transaction control platform 104 may send, to the transfer channel 108-1, a cancellation request to cancel the fund transfer request sent at step 114.

At step 128, the transfer channel 108-N may process the fund transfer based on the new fund transfer request. In an example, the computing platform associated with the transfer channel 108-N may process the fund transfer. The computing platform may be associated with the payee's bank or an intermediary entity (e.g., an intermediary bank, financial entity, etc.). The computing platform may process the fund transfer to the intermediary account and/or the destination account based on the fund transfer request. The computing platform associated with the transfer channel 108-N may use the transaction details in the new fund transfer request to credit funds to the destination account/intermediary account.

At step 130, the computing platform associated with the transfer channel 108-N may send a transfer confirmation message to the front-end notification unit 102, transaction analytics monitoring unit 106, and/or to the transaction input device 112. At step 132, the transaction analytics monitoring unit 106 may store attributes associated with the successful fund transfer (e.g., source user account, destination user account, the transfer channel 108-N, etc.) in the log file. The transaction control platform 104 may use the stored attributes for determining transfer channels for future fund transfer requests. The transaction control platform 104 may, for example, select the transfer channel 108-N for a future fund transfer request, for example, if the future fund transfer request indicates that the transfer channel 108-1 is to be used for the future fund transfer.

Figure 2:
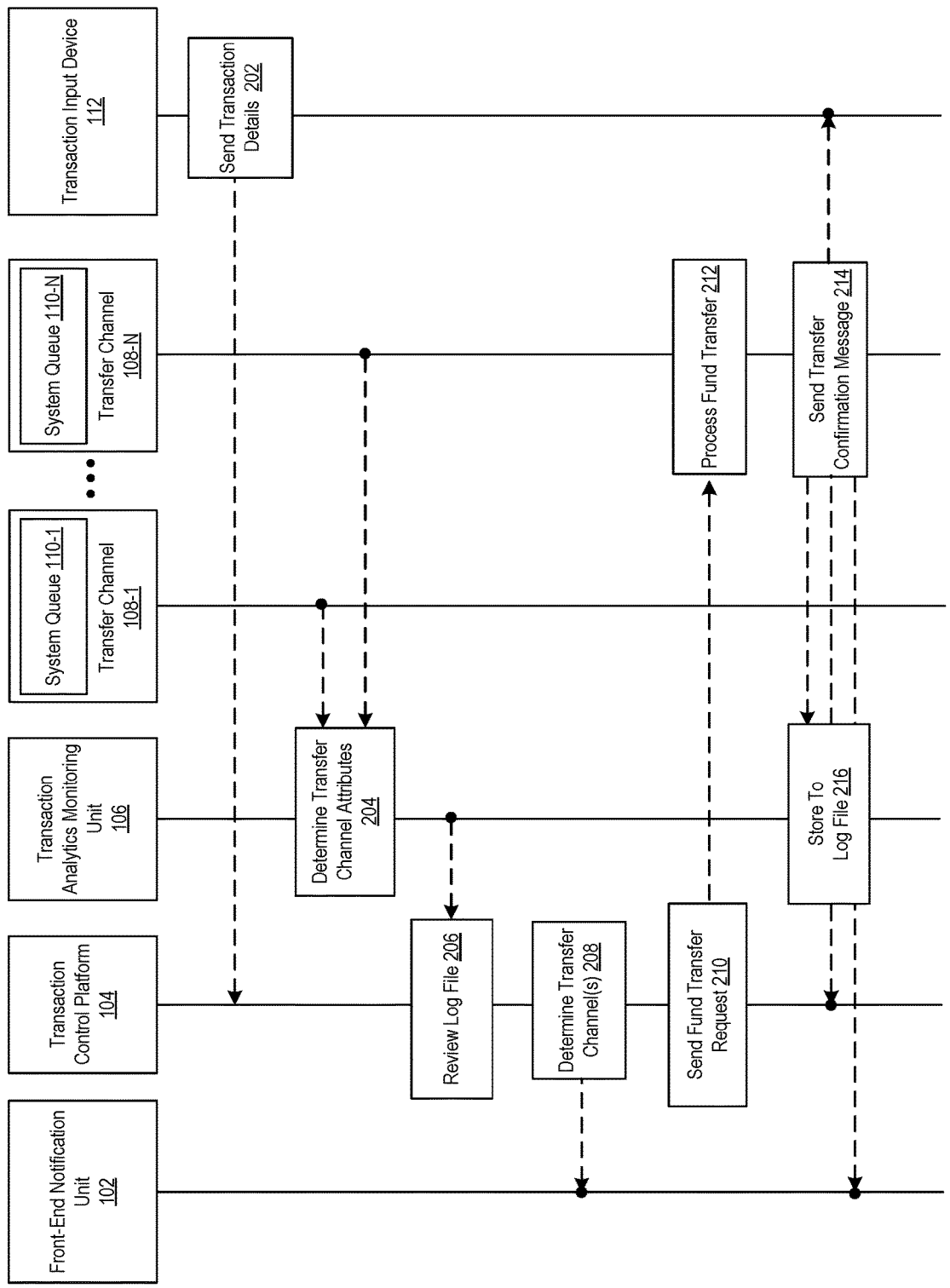
FIG. 2 shows an illustrative event sequence for a fund transfer between two entities in accordance with one or more examples described herein.

FIG. 2 shows an illustrative event sequence for a fund transfer between two entities in accordance with one or more examples described herein. The entities may be, for example, a payer's bank and a payee's bank. Like numbered elements may operate in a similar manner as described above with reference to FIG. 1 and are not described in detail for brevity.

At step 202, the transaction input device 112 may send transaction details to the transaction control platform 104. The transaction details may comprise transaction details as described above with reference to FIG. 1. For example, the transaction input device 112 may send a fund transfer request to a transaction control platform 104. The fund transfer request may comprise transaction details associated with, for example, a transfer of funds from the payer's bank to the payee's bank. The transaction details may comprise indications of one or more selected from a group comprising of: a source account, a destination account, intermediary account(s), a value of funds to be transferred, an origin currency, a destination currency, a transaction type, a transaction structure, and/or a combination thereof. The transaction type may indicate one or more payment systems to be used for the fund transfer (e.g., ACH system, RTGS system, SWIFT network, etc.).

At step 204, the transaction analytics monitoring unit 106 may determine attributes associated with the available transfer channels 108. The attributes may be similar to or the same as the attributes described above with reference to FIG. 1.

At step 208, the transaction control platform 104 may determine a transfer channel among the available transfer channels 108. The transaction control platform 104 may determine the transfer channel based on the determined attributes associated with the transfer channels 108 and/or the transaction details. The transaction control platform 104 may determine the transfer channel, for example, based on reviewing the log file (e.g., at step 120). The transaction control platform 104 may determine the transfer channel based on a machine learning algorithm. The transaction control platform 104 may determine the transfer channel based on an LCR algorithm as described herein. Determining the transfer channel may comprise determining one or more payment systems and/or intermediary accounts for the fund transfer between the source account and the destination account. For example, the transaction control platform may determine the transfer channel 108-N for the fund transfer.

The transaction control platform 104 may use a machine learning algorithm to determine respective expected wait times for completing the fund transfer over the respective transfer channels 108. The transaction control platform 104 may determine the transfer channel 108-N for the fund transfer, for example, if an expected wait time for completing the fund transfer over the transfer channel 108-1 is a lowest expected wait time among the respective expected wait times. The transaction control platform 104 may determine the transfer channel 108-N for the fund transfer, for example, if a length of the system queue 110-N is lowest among the lengths of the system queues 110.

The transaction control platform 104 may use a machine learning algorithm to determine respective expected usage costs for completing the fund transfer over the respective transfer channels 108. The transaction control platform 104 may determine the transfer channel 108-N for the fund transfer, for example, if an expected usage cost for completing the fund transfer over the transfer channel 108-N is lowest among the respective expected costs. The expected usage costs may comprise processing costs (e.g., costs associated with using the transfer channels 108) and/or currency conversion costs (e.g., costs associated with any currency conversions over the transfer channels 108).

The transaction control platform 104 may use a machine learning algorithm to determine operation status of the transfer channels 108. The transaction control platform 104 may use handshake signals to determine the operation status.

For example, transaction control platform 104 may determine the transfer channel 108-1 is not operational based on determining that the transaction control platform 104 has previously not received handshake signals from one or more computing platforms associated with the transfer channel 108-1. The transaction control platform 104 may determine the transfer channel 108-N is operational based on determining that the transaction control platform 104 has previously received handshake signals from one or more computing platforms associated with the transfer channel 108-N. The transaction control platform 104 may determine the transfer channel 108-N for the fund transfer, for example, based on determining that the transfer channel 108-N is operational.

The transaction control platform 104 may use a machine learning algorithm to determine country-based restrictions associated with the transfer channels 108. For example, some payment systems may not be operational in some countries. The transaction control platform 104 may determine the transfer channel 108-N for the fund transfer, for example, based on the determined restrictions.

The transaction control platform 104 may use a machine learning algorithm to determine customer satisfaction scores associated with the transfer channels 108. Some payment systems may be associated with higher customer satisfaction scores, for example, based on lower costs and/or faster fund transfer times. The transaction control platform 104 may determine the transfer channel 108-N for the fund transfer, for example, based on determining that a customer satisfaction score associated with the transfer channel 108-N is above a threshold score. The transaction control platform 104 may use a machine learning algorithm to determine the threshold score.

At step 210, the transaction control platform may send a fund transfer request to the transfer channel 108-N (e.g., to a computing platform associated with the transfer channel 108-1). The fund transfer request may comprise transaction details associated with a transfer of funds from the payer's bank to the payee's bank. The fund transfer request may comprise information included in the fund transfer request.

At step 212, the transfer channel 108-N may process the fund transfer based on the fund transfer request. In an example, the computing platform associated with the transfer channel 108-N may process the fund transfer. The computing platform may be associated with the payee's bank and may process the fund transfer to the destination account based on the fund transfer request. The computing platform may be associated with an intermediary entity (e.g., an intermediary bank, financial entity, etc.) and may process the fund transfer to the intermediary account based on the fund transfer request. The transaction analytics monitoring unit 106 may monitor a status of the fund transfer over the transfer channel 108-N. The transaction control platform may use one or more techniques described with reference to FIG. 1A to select a new transfer channel if the fund transfer over the transfer channel 108-N is delayed or fails.

At step 214, the computing platform associated with the transfer channel 108-N may send a transfer confirmation message to the front-end notification unit 102, transaction analytics monitoring unit 106, and/or to the transaction input device 112. The computing platform associated with the transfer channel 108-N may send the transfer confirmation message, for example, if the fund transfer is processed to the destination account and/or to the intermediary account. At step 216, the transaction analytics monitoring unit 106 may store attributes associated with the successful fund transfer (e.g., source user account, destination user account, the transfer channel 108-N, etc.). The transaction analytics monitoring platform 106 may use the attributes for determining transfer channels for future fund requests.

Figure 3A:
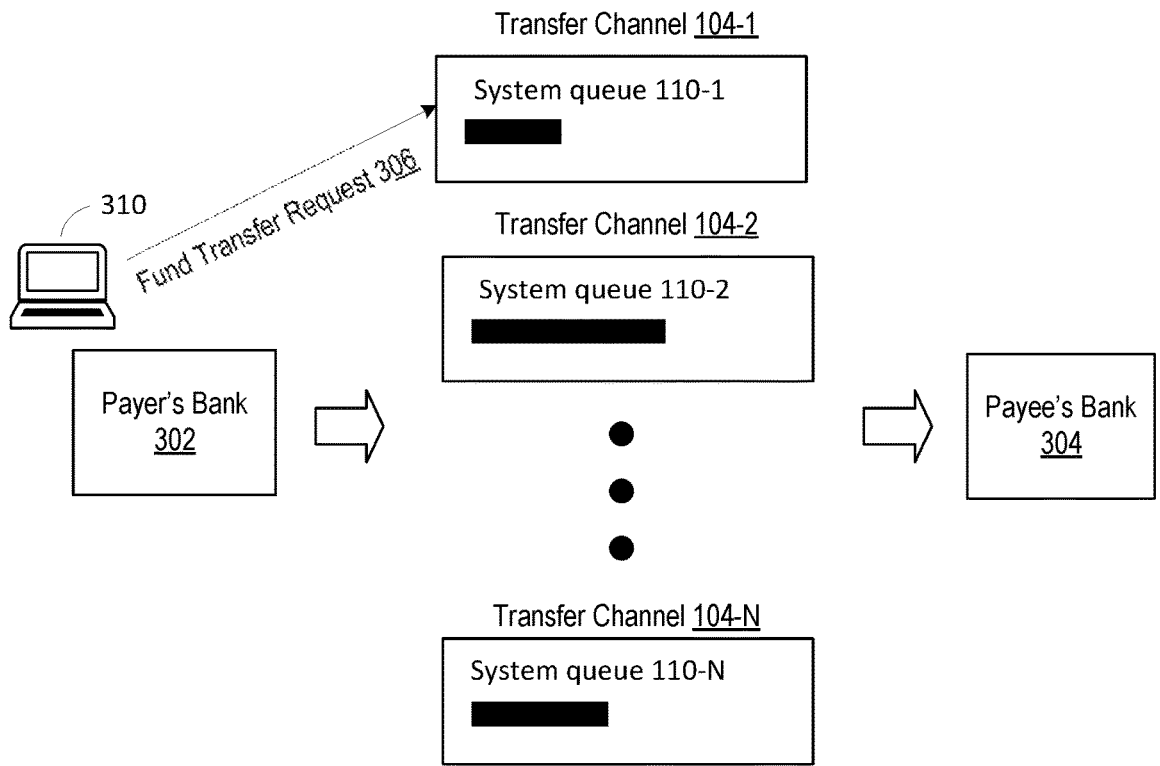
FIGS. 3A and 3B show an example procedure for a fund transfer between two entities in accordance with one or more examples described herein.
Figure 3B:
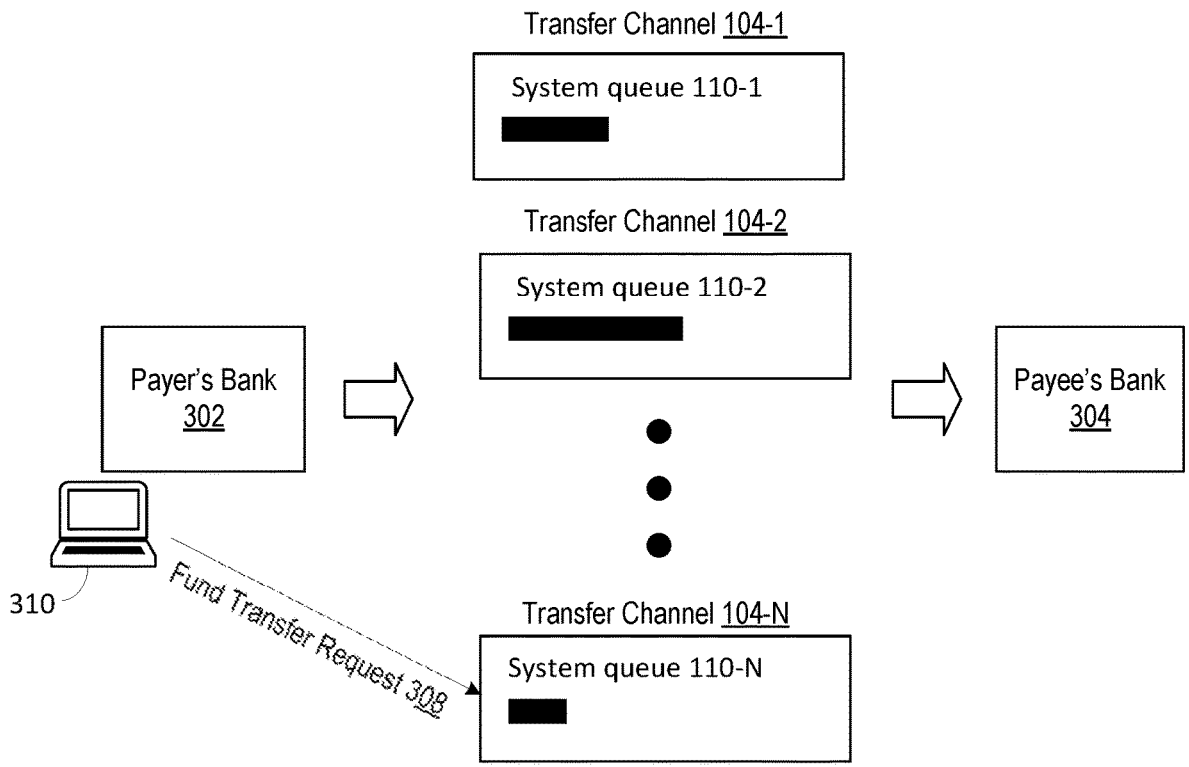

FIGS. 3A and 3B show an example procedure for a fund transfer between two entities in accordance with one or more examples described herein. The entities may be for example a payer's bank 302 and a payee's bank 304. The example procedure may correspond to the illustrative event sequences described with reference to FIGS. 1 and 2. As shown in FIG. 3A, a computing device 310 (e.g., the transaction control platform 104, the transaction input device 112) may transmit a fund transfer request 306 (e.g., the fund transfer request as described with reference to FIG. 1, or the fund transfer request as described with reference to FIG. 2) to the transfer channel 108-1. The computing device 310 may transmit the fund transfer request 306 to the transfer channel 108-1, for example, based on determination of transfer channels as described with reference to FIG. 1 or FIG. 2. For example, the computing device 310 may transmit the fund transfer request 306 to the transfer channel 108-1 based on determining that the system queue 110-1 is the shortest among the system queues 110.

The computing device 310 may determine that the fund transfer, based on the fund transfer request 306, is delayed. The computing device 310 may determine the fund transfer is delayed if an expected wait time for completing the fund transfer over the transfer channel 108-1 is greater than a cut-off time. The computing device 310 may determine that the fund transfer is delayed if the computing device 310 does not receive a handshake signal (e.g., within a handshake signal wait time) from a computing platform associated with the transfer channel 108-1. The computing device 310 may determine the fund transfer is delayed if a difference between a cut-off time and an elapsed time following the transmission of the fund transfer request 306 is greater than a threshold.

The computing device 310 may determine a new transfer channel based on one or more considerations described with reference to FIGS. 1 and 2. The computing device 310 may determine the transfer channel 108-N as the new transfer channel based on determining that the system queue 110-N is now smaller than the system queue 104-1. The computing device 310 may determine the transfer channel 108-N as the new transfer channel based on determining that an expected wait time for completing the fund transfer over the transfer channel 104-N is now less than the expected wait time for completing the fund transfer over the transfer channel 104-1. As shown in FIG. 3B, the computing device 310 may transmit a fund transfer request 308 to the transfer channel 108-N.

Figure 4:
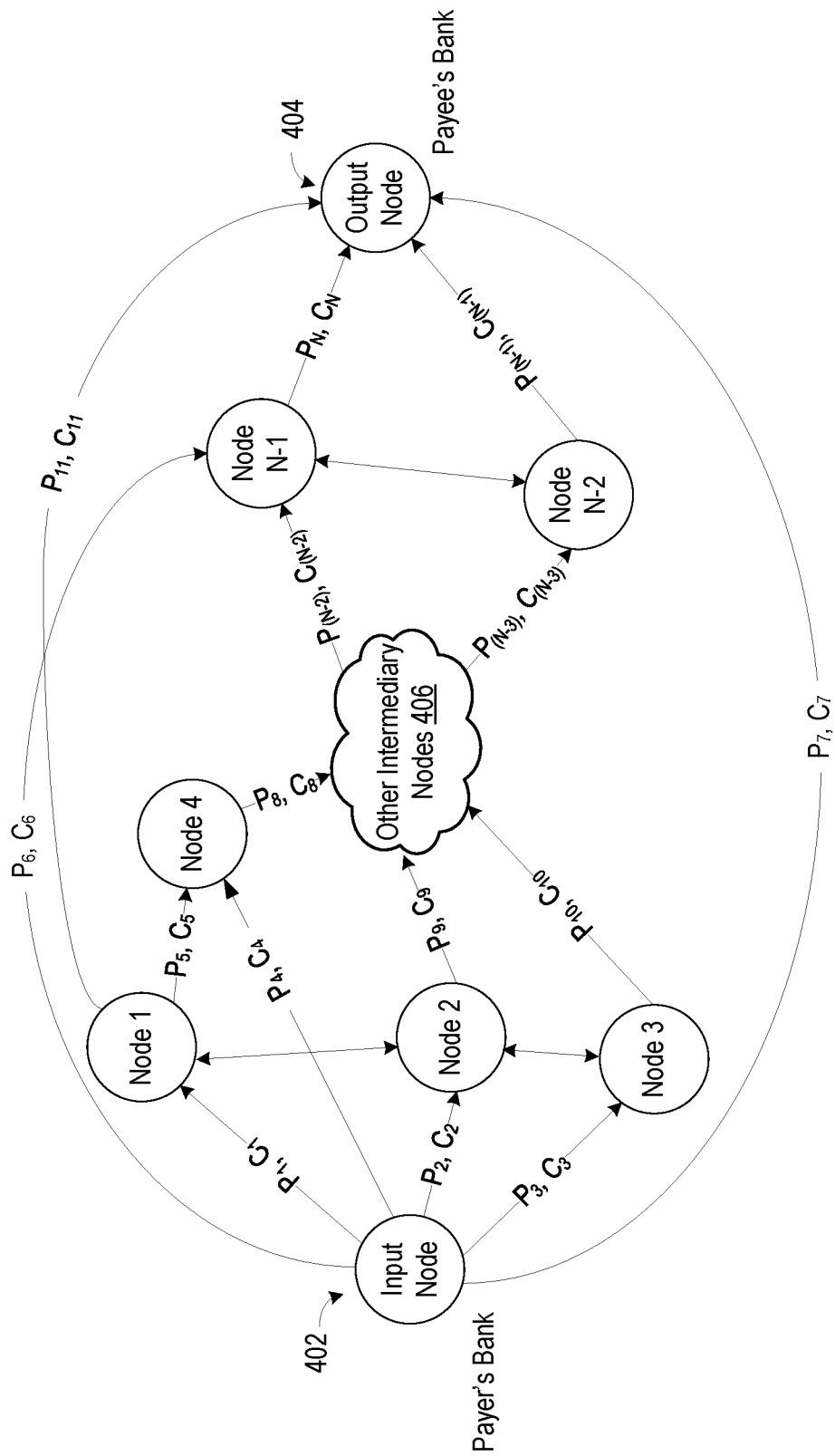
FIG. 4 shows an example node diagram for a transaction between two entities in accordance with one or more examples described herein.

FIG. 4 shows an example node diagram for a transaction between two entities in accordance with one or more examples described herein. A transaction between an input node 402 and an output node 404 may be processed using one of a plurality of routes between the input node 402 and the output node 404. A route may traverse one or more paths P between the input node 402, intermediary nodes (e.g., node 1, node 2 . . . node N, other intermediary nodes 406), and the output node 404. For example, a first route may comprise paths $P_6$ and $P_N$, a second route may comprise path $P_7$, a third route may comprise paths $P_3$, $P_{10}$, one or more of the other intermediary nodes 406, $P_{(N-3)}$, and $P_{(N-1)}$.

Each path $P_i$ may be associated with a corresponding cost $C_i$. A cost for traversing a route between the input node 402 and the output node 404 may be a sum of costs associated with all paths in the route. For example, a cost associated with a first route comprising path $P_6$ and $P_N$ may be $C_6+C_N$.

As another example, a cost associated with a second route comprising path $P_7$ may be $C_7$. An LCR algorithm may be used to determine a route, between the input node 402 and the output node 404, that has a total lowest cost. For example, the LCR algorithm may determine that the first route has a lowest cost among all available routes between the input node 402 and the output node 404. A load-balancing algorithm may be used to determine a route, between the input node 402 and the output node 404, to avoid congestion at a node/path.

With reference to fund transfer procedures described herein, a node may represent a bank, an account, and/or currency type(s) (e.g., United States dollars, euros, pounds sterling, etc.). The input node 402 may represent a payer's bank, an origin account, and/or an origin currency type. The output node 404 may represent a payee's bank, a destination account, and/or a destination currency type. The routes between the input node 402 and the output node 404 may correspond to available transfer channels between the input node 402 and the output node 404. A path $P_i$ between two nodes may correspond to a payment system for fund transfer between the two nodes and/or a currency conversion step. Cost $C_i$ associated with a path $P_i$ between two nodes may correspond to a usage cost (e.g., a dollar amount) associated with a fund transfer between the two nodes, expected wait time associated with completing the fund transfer between the two nodes, and/or a customer satisfaction score associated with using the path $P_i$. The cost $C_i$ may correspond to a combination of two or more of the above parameters. One or more of the usage cost, the expected wait time, and the customer satisfaction score may be determined based on a machine learning algorithm.

The transaction control platform 104 may use the LCR algorithm to determine a route (e.g., transfer channel) between the input node 402 (e.g., payer's bank) and the output node 404 (e.g., the payee's bank) that is associated with the lowest cost. A lower cost may correspond to a lower usage cost, a lower expected wait time, and/or a higher customer satisfaction score. For example, the transaction control platform 104 may use the LCR algorithm to determine that the route comprising the path $P_6$ and $P_N$ is associated with the lowest cost among the routes between the input node 402 and the output node 404.

In an example, the payee's bank and the payer's bank may be in different countries and an origin currency type (e.g., USD) at the payee's bank may be different from the destination currency type (e.g., Chilean pesos) at the payer's bank. The transaction control platform 104 may determine a transfer channel comprising paths corresponding to one or more currency conversion steps that may facilitate conversion from the origin currency type to the destination currency type. When multiple such transfer channels exist, a transfer channel with a lowest cost may be selected based on the LCR algorithm. In an example, paths $P_1$ and $P_N$ may both correspond to a currency conversion from USD to Chilean peso. Path $P_1$ may correspond to a currency conversion at the payer's bank, while path $P_N$ may correspond to a currency conversion at the payee's bank. The transaction control platform 104 may select a transfer channel with the path $P_N$ based on determining that cost $C_N$ associated with path $P_N$ is lower than cost $C_1$ associated with path $P_1$.

In an example, one or more nodes may be unable to process at least some currency types. For example, the payer's bank may only process USD, and the payee's bank may only process Algerian dinars. The transaction control platform 104 may determine a transfer channel that facilitates the currency conversion between USD and Algerian dinars. For example, if node 3 corresponds to an intermediary bank that may process both USDs and Algerian dinars, the transaction control platform 104 may select a transfer channel that comprises node 3.

In an example, one or more paths $P_i$ may be non-operational. The transaction control platform 104 may determine a transfer channel based on determined operation status of the paths $P_i$. The transaction control platform 104 may determine an operation status of a path based on handshake signals received from a computing platform associated with the path. For example, the transfer control platform 104 may determine that a handshake signal was not received from a computing platform associated with the node 4. The transaction control platform 104 may determine a transfer channel that does not include node 4.

Figure 5:
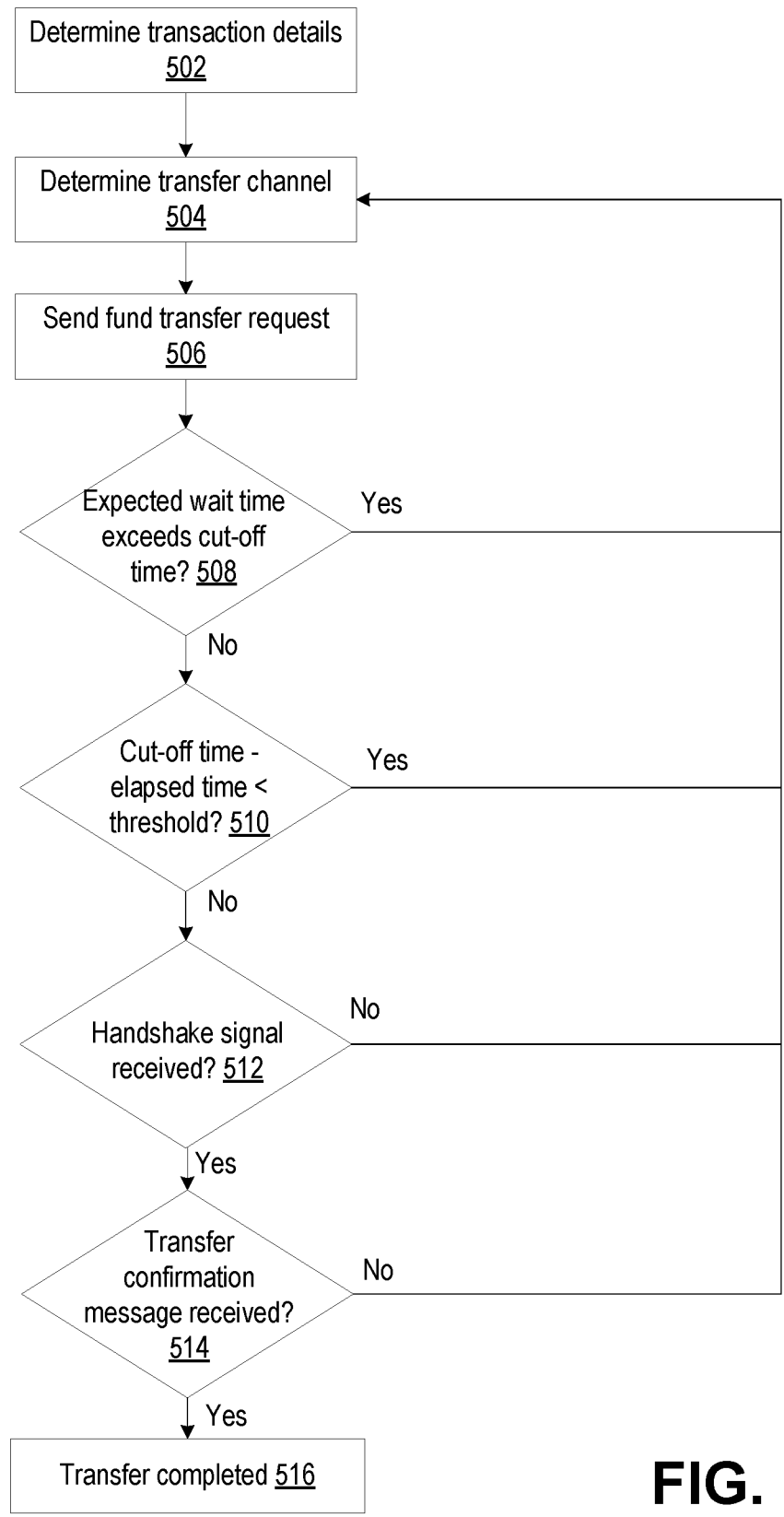
FIG. 5 shows a flowchart of an example fund transfer procedure in accordance with one or more examples described herein.

FIG. 5 shows a flowchart of an example fund transfer procedure in accordance with one or more examples described herein. At step 502, the transaction control platform may determine transaction details corresponding to a fund transfer from a payer's bank to a payee's bank. The transaction details may comprise indications of one or more of: source account, destination account, intermediary accounts, a value of funds to be transferred, an origin currency, a destination currency, a cut-off time, and/or the like. At step 504, the transaction control platform 104 may determine a transfer channel. The transaction control platform 104 may determine a transfer channel in accordance with one or more techniques described with reference to FIGS. 1-4. At step 506, the transaction control platform 104 may send, to a computing platform associated with the determined transfer channel, a fund transfer request.

At step 508, the transaction control platform 104 may determine whether an expected wait time for the fund transfer (e.g., as determined by the transaction control platform 104) exceeds the cut-off time. If the transaction control platform 104 determines that the expected wait time exceeds the cut-off time, the procedure returns to step 504. At step 510, the transaction control platform 104 may determine whether a difference between the cut-off time and an elapsed time (e.g., following the sending of the fund transfer request) is less than a threshold time. If the transaction control platform 104 determines that the difference is less than the threshold time, the procedure returns to step 504. At step 510, the transaction control platform 104 may determine whether a handshake signal was received (e.g., within a handshake signal wait time) following the sending of the fund transfer request. If the transaction control platform 104 determines that the handshake signal was not received, the procedure returns to step 504. At step 510, the transaction control platform 104 may determine whether a transfer confirmation message was received (e.g., within a cut-off time) following the sending of the fund transfer request. If the transaction control platform 104 determines that the transfer confirmation message was not received, the procedure returns to step 504. The transaction control platform 104 may determine a new transfer channel, for example, if the procedure returns to step 504. If the transaction control platform 104 determines that the transfer confirmation message was received, the transaction control platform 104 may determine that the fund transfer was successfully completed.

Figure 6A:
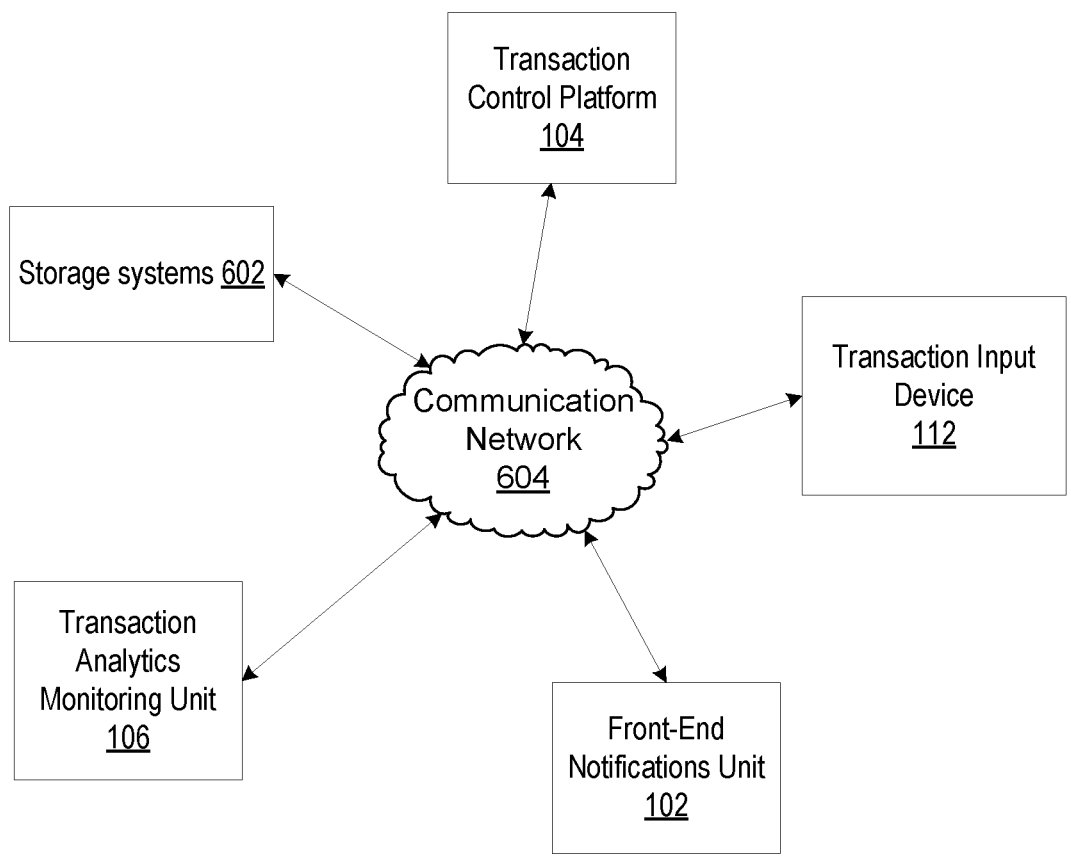
FIG. 6A shows an illustrative computing environment for a fund transfer procedure in accordance with one or more examples described herein.

FIG. 6A depicts an illustrative computing environment for a fund transfer procedure in accordance with one or more examples described herein. A computing environment 600 may comprise one or more devices (e.g., computer systems, communication devices, access control systems, and/or networked sensors). The computing environment 600 may comprise, for example, the transaction control platform 104, the transaction analytics monitoring unit 106, the transaction input device 112, storage systems 602, and/or front-end notifications unit 102. One or more of the devices and/or systems, may be linked over communication network(s) 604. The communication network(s) 604 may comprise public networks and/or private networks. The communication network(s) 604 may use wired and/or wireless communication protocols.

The transaction analytics monitoring unit 106 may comprise, for example, one or more computers (e.g., laptop computers, desktop computers, servers, server blades, or the like). The transaction input device 115 may be a personal computing device (e.g., desktop computer, laptop computer) or mobile computing device (e.g., smartphone, tablet). The transaction input device 115 may be linked to and/or operated by the payer or by an employee associated with the payer's bank.

The front-end notifications unit 102 may be a personal computing device (e.g., desktop computer, laptop computer) or mobile computing device (e.g., smartphone, tablet). The front-end notifications unit 102 may be linked to and/or operated by an administrative user of the payer's bank. In another example, the front-end notifications unit 102 may be integrated with the transaction input device 112. The front-end notifications unit 102 may receive data from the transaction control platform 104, manipulate and/or otherwise process such data, and/or return processed data and/or other data to the transaction control platform 104 and/or to other computer systems in the computing environment 600. The front-end notifications unit 102 may be configured to control operation of the transaction control platform 104.

The storage systems 602 may be used for storing attributes associated with transfer channels (e.g., as determined by the transaction analytics monitoring unit), log files, and/or historical data associated fund transfers over the transfer channels. The storage systems 602 may comprise one or more electronic memory devices such as tape drives, hard disk drives, optical disks, removable storage media, solid-state memory, RAM, and the like.

Figure 6B:
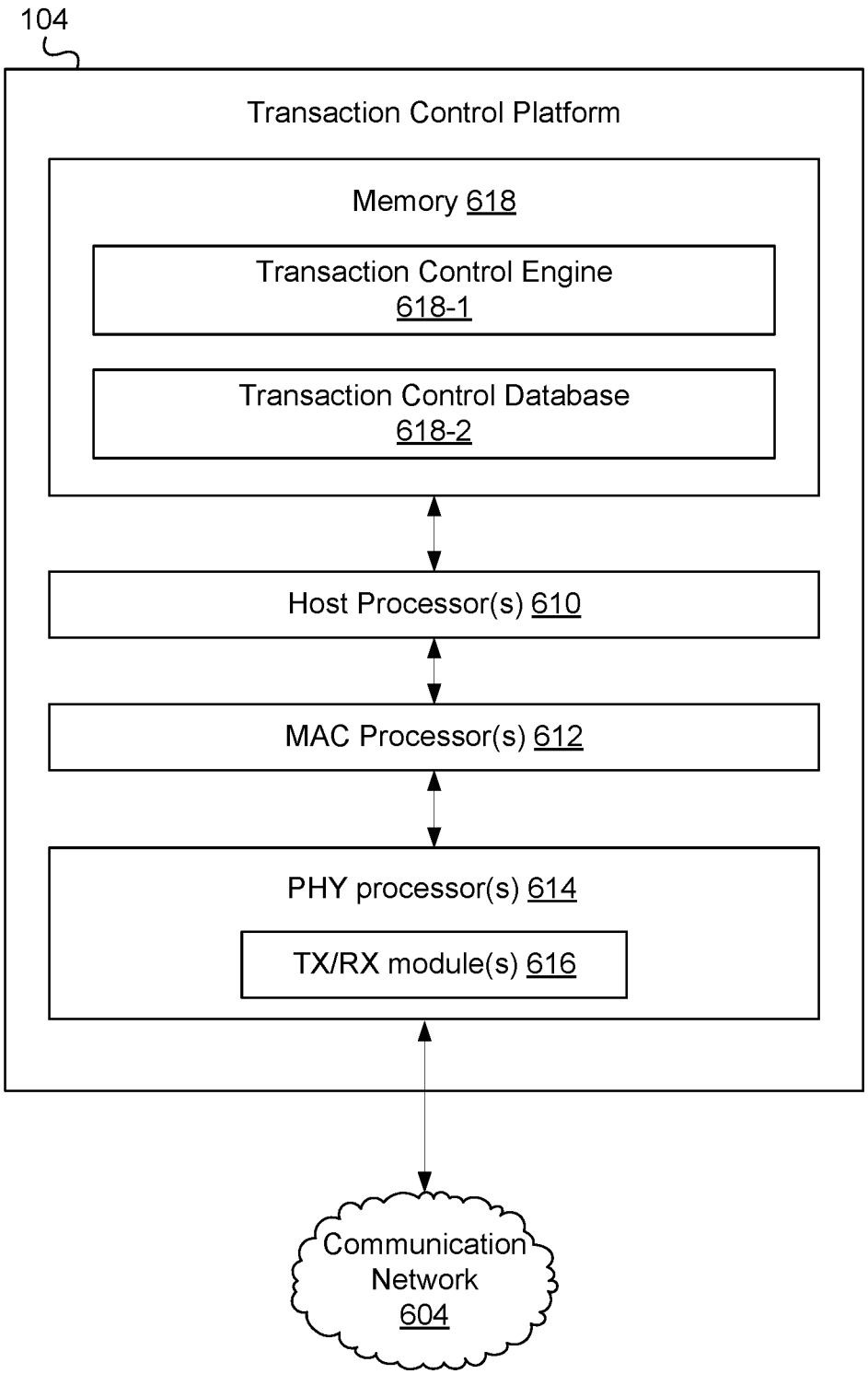
FIG. 6B shows an illustrative transaction control platform in accordance with one or more examples described herein.

FIG. 6B shows an illustrative transaction control platform 104 in accordance with one or more examples described herein. The transaction control platform 104 may comprise one or more host processor(s) 610, medium transaction control (MAC) processor(s) 612, physical layer (PHY) processor(s) 614, transmit/receive (TX/RX) module(s) 616, memory 618, and/or the like. One or more data buses may interconnect host processor(s) 610, MAC processor(s) 612, PHY processor(s) 614, and/or Tx/Rx module(s) 616, and/or memory 618. The transaction control platform 104 may be implemented using one or more integrated circuits (ICs), software, or a combination thereof, configured to operate as discussed below. The host processor(s) 610, the MAC processor(s) 612, and the PHY processor(s) 614 may be implemented, at least partially, on a single IC or multiple ICs. Memory 618 may be any memory such as a random-access memory (RAM), a read-only memory (ROM), a flash memory, or any other electronically readable memory, or the like.

Messages transmitted from and received at devices in the computing environment 600 may be encoded in one or more MAC data units and/or PHY data units. The MAC processor(s) 612 and/or the PHY processor(s) 614 of the transaction control platform 105 are configured to generate data units, and process received data units, that conform to any suitable wired and/or wireless communication protocol. For example, the MAC processor(s) 612 may be configured to implement MAC layer functions, and the PHY processor(s) 614 may be configured to implement PHY layer functions corresponding to the communication protocol. The MAC processor(s) 612 may, for example, generate MAC data units (e.g., MAC protocol data units (MPDUs)), and forward the MAC data units to the PHY processor(s) 614. The PHY processor(s) 614 may, for example, generate PHY data units (e.g., PHY protocol data units (PPDUs)) based on the MAC layer data units. The generated PHY data units may be transmitted via the TX/RX module(s) 616 over the communication network 604. Similarly, the PHY processor(s) 614 may receive PHY data units from the TX/RX module(s) 614-1, extract MAC layer data units encapsulated within the PHY data units, and forward the extracted MAC data units to the MAC processor(s). The MAC processor(s) 612 may then process the MAC data units as forwarded by the PHY processor(s) 614.

One or more processors (e.g., the host processor(s) 610, the MAC processor(s) 612, the PHY processor(s) 614, and/or the like) of the transaction control platform 104 may be configured to execute machine readable instructions stored in memory 618. Memory 618 may comprise (i) one or more program modules/engines having instructions that when executed by the one or more processors cause the transaction control platform 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the transaction control platform 104 and/or by different computing devices that may form and/or otherwise make up the transaction control platform 104. For example, memory 618 may have, store, and/or comprise a transaction control engine 618-1, and a transaction control database 618-2. The transaction control engine 618-1 may have instructions that direct and/or cause the transaction control platform 104 to perform one or more operations as discussed herein. The transaction control database 618-2 may store log file information (e.g., determined attributes of the transfer channels, historical record of failed/successful transactions, and/or the like).

While FIG. 6A illustrates the transaction control platform 104 as being separate from other elements connected in communication network 604, in one or more other arrangements, the transaction control platform 104 may be included in one or more of the transaction analytics monitoring unit 106, the transaction input device 112, and/or front-end notifications unit 102. Elements in the transaction control platform 104 (e.g., host processor(s) 610, memory(s) 618, MAC processor(s) 612, PHY processor(s) 614, and TX/RX module(s) 616, one or more program modules and/or stored in memory(s) 618) may share hardware and software elements with and corresponding to, for example, one or more of the transaction analytics monitoring unit 106, the transaction input device 112, and/or front-end notifications unit 102.

Figure 7:
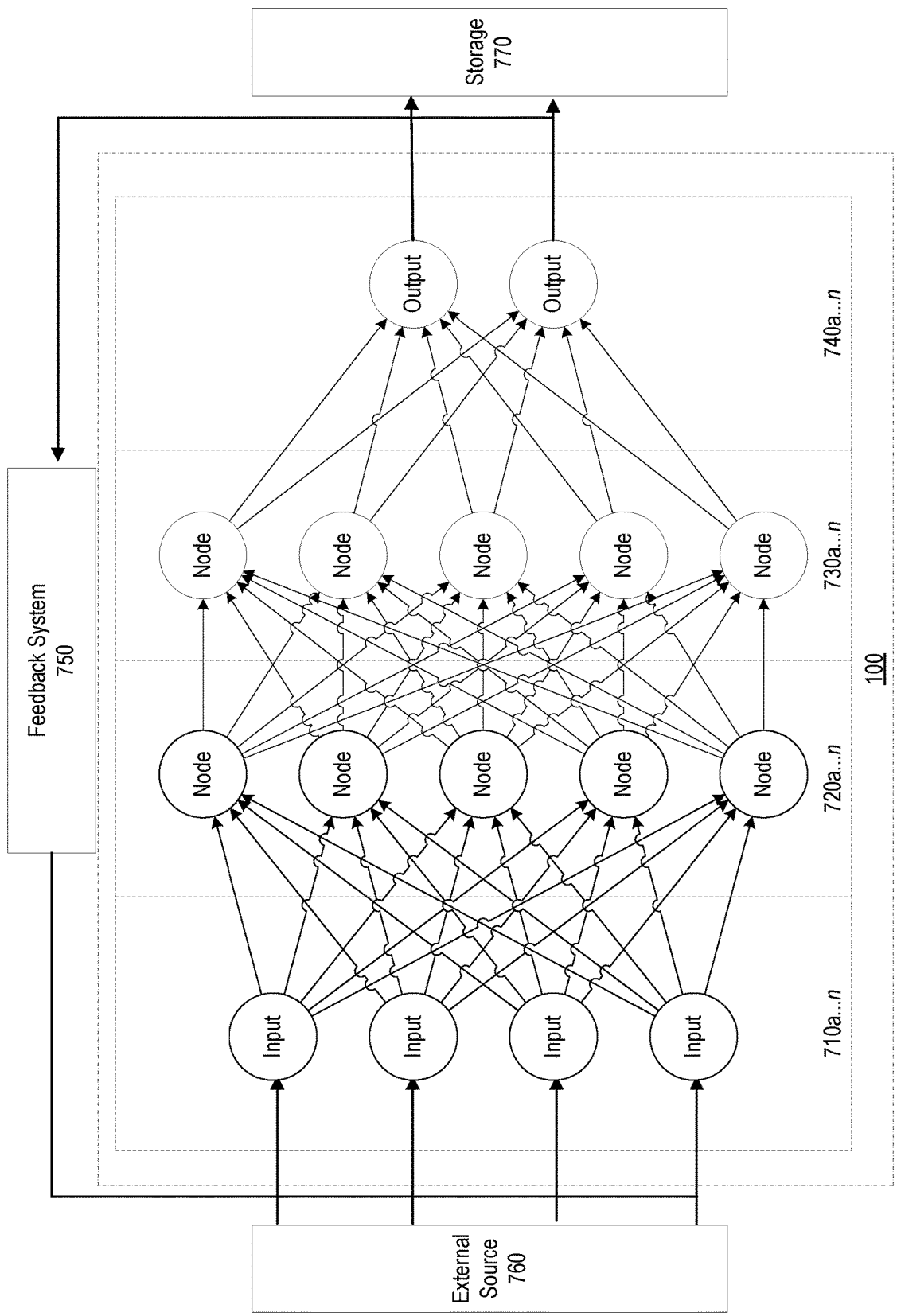
FIG. 7 illustrates a simplified example of an artificial neural network on which a machine learning algorithm may be executed in accordance with one or more examples described herein.

FIG. 7 illustrates a simplified example of an artificial neural network 700 on which a machine learning algorithm may be executed. FIG. 7 is merely an example of nonlinear processing using an artificial neural network; other forms of nonlinear processing may be used to implement a machine learning algorithm in accordance with features described herein.

In one example, a framework for a machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks (e.g., the human brain). Such structures, while significantly more complex than conventional computer systems, are beneficial in implementing machine learning. For example, an artificial neural network may be comprised of a large set of nodes which, like neurons in the brain, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 700 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct").

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

By way of example, in FIG. 7, each of input nodes 710*a-n* is connected to a first set of processing nodes 720*a-n*. Each of the first set of processing nodes 720*a-n* is connected to each of a second set of processing nodes 730*a-n*. Each of the second set of processing nodes 730*a-n* is connected to each of output nodes 740*a-n*. Though only two sets of processing nodes are shown, any number of processing nodes may be implemented. Similarly, though only four input nodes, five processing nodes, and two output nodes per set are shown in FIG. 7, any number of nodes may be implemented per set. Data flows in FIG. 7 are depicted from left to right: data may be input into an input node, may flow through one or more processing nodes, and may be output by an output node. Input into the input nodes 710*a-n* may originate from an external source 760. The input from the input nodes may be, for example, one or more of: transaction details, historical data corresponding to attributes associated with successful/delayed fund transfers, determined attributes associated with the transfer channels, log file data, and/or the like. Output may be sent to a feedback system 750 and/or to storage 770. The feedback system 750 may send output to the input nodes 710*a-n* for successive processing iterations with the same or different input data.

In one illustrative method using feedback system 750, the system may use machine learning to determine an output. The output may include one or more of: determined transfer channel(s), expected wait times, threshold queue lengths, threshold times, predicted expected handshake wait times, threshold customer satisfaction scores, confidence values, operation status of transfer channels, predicted expected usage costs, classification output, and/or the like. The system may use one of a myriad of machine learning models including xg-boosted decision trees, auto-encoders, perceptron, decision trees, support vector machines, regression, and/or a neural network. The neural network may be any of a myriad of type of neural networks including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tan h function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially.

In one example, FIG. 7 depicts nodes that may perform various types of processing, such as discrete computations, computer programs, and/or mathematical functions implemented by a computing device. For example, the input nodes 710a-n may comprise logical inputs of different data sources, such as one or more data servers. The processing nodes 720a-n may comprise parallel processes executing on multiple servers in a data center. And, the output nodes 740a-n may be the logical outputs that ultimately are stored in results data stores, such as the same or different data servers as for the input nodes 710a-n. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 700 may learn and/or be dynamically reconfigured. Though nodes are depicted as having connections only to successive nodes in FIG. 7, connections may be formed between any nodes. For example, one processing node may be configured to send output to a previous processing node.

Input received in the input nodes 710a-n may be processed through processing nodes, such as the first set of processing nodes 720a-n and the second set of processing nodes 730a-n. The processing may result in output in output nodes 740a-n. As depicted by the connections from the first set of processing nodes 720a-n and the second set of processing nodes 730a-n, processing may comprise multiple steps or sequences. For example, the first set of processing nodes 720a-n may be a rough data filter, whereas the second set of processing nodes 730a-n may be a more detailed data filter.

The artificial neural network 700 may be configured to effectuate decision-making. As a simplified example for the purposes of explanation, the artificial neural network 700 may be configured to detect faces in photographs. The input nodes 710a-n may be provided with a digital copy of a photograph. The first set of processing nodes 720a-n may be each configured to perform specific steps to remove non-facial content, such as large contiguous sections of the color red. The second set of processing nodes 730a-n may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 700 may then predict the location on the face. The prediction may be correct or incorrect.

The feedback system 750 may be configured to determine whether or not the artificial neural network 700 made a correct decision. Feedback may comprise an indication of a correct answer and/or an indication of an incorrect answer and/or a degree of correctness (e.g., a percentage). For example, in the facial recognition example provided above, the feedback system 750 may be configured to determine if the face was correctly identified and, if so, what percentage of the face was correctly identified. The feedback system 750 may already know a correct answer, such that the feedback system may train the artificial neural network 700 by indicating whether it made a correct decision. The feedback system 750 may comprise human input, such as an administrator telling the artificial neural network 700 whether it made a correct decision. The feedback system may provide feedback (e.g., an indication of whether the previous output was correct or incorrect) to the artificial neural network 700 via input nodes 710a-n or may transmit such information to one or more nodes. The feedback system 750 may additionally or alternatively be coupled to the storage 770 such that output is stored. The feedback system may not have correct answers at all, but instead base feedback on further processing: for example, the feedback system may comprise a system programmed to identify faces, such that the feedback allows the artificial neural network 700 to compare its results to that of a manually programmed system.

The artificial neural network 700 may be dynamically modified to learn and provide better input. Based on, for example, previous input and output and feedback from the feedback system 750, the artificial neural network 700 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 700, such that the artificial neural network 700 may vary its nodes and connections to test hypotheses.

The artificial neural network 700 need not have a set number of processing nodes or number of sets of processing nodes, but may increase or decrease its complexity. For example, the artificial neural network 700 may determine that one or more processing nodes are unnecessary or should be repurposed, and either discard or reconfigure the processing nodes on that basis. As another example, the artificial neural network 700 may determine that further processing of all or part of the input is required and add additional processing nodes and/or sets of processing nodes on that basis.

The feedback provided by the feedback system 750 may be mere reinforcement (e.g., providing an indication that output is correct or incorrect, awarding the machine learning algorithm a number of points, or the like) or may be specific (e.g., providing the correct output). For example, the machine learning algorithm 700 may be asked to detect faces in photographs. Based on an output, the feedback system 750 may indicate a score (e.g., 75% accuracy, an indication that the guess was accurate, or the like) or a specific response (e.g., specifically identifying where the face was located).

The artificial neural network 700 may be supported or replaced by other forms of machine learning. For example, one or more of the nodes of artificial neural network 700 may implement a decision tree, associational rule set, logic programming, regression model, cluster analysis mechanisms, Bayesian network, propositional formulae, generative models, and/or other algorithms or forms of decision-making. The artificial neural network 700 may effectuate deep learning.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

I claim:

1. A method for transferring funds from a payer to a payee based on a transmission of an electronic message from the payer to a financial institution associated with the payer, the method comprising:

receiving, via a communication interface, a first message indicating a first request to process a fund transfer via a first transfer channel of a plurality of available transfer channels, the first message indicating a first request to process a funds transfer via a first transfer channel computing device in electronic communication with a transaction control computing platform, wherein the first transfer channel computing device is configured to transfer the funds based on the first request to a destination account of the payee maintained at a payee financial institution having a destination computing device in electronic communication with the first transfer channel computing device, wherein the first request comprises transaction details associated with the funds transfer including a transaction type, wherein the transaction type is associated with the first transfer channel and indicates that the first transfer channel of the plurality of available transfer channels is to be used for the funds transfer, wherein the first transfer channel comprises a system queue for storing one or more fund transfer requests which are processed in an order specified by the system queue, wherein the transaction control computing platform comprises a transaction analytics computing unit for monitoring funds transfer attributes associated with the plurality of available transfer channels and for storing determined attributes in a log file and periodically updating the log file based on the determined attributes and the monitoring, and wherein the funds transfer attributes are associated with at least one of a cost, timing and efficiency of transfer channels;

determining from the first request that the first transfer channel of the plurality of available transfer channels is to be used for processing the first request;

determining respective attributes of the other available transfer channels;

monitoring a real-time status of the attributes of the first transfer channel to detect when the first transfer channel does not meet at least one criteria based on the first message;

selecting, in response to the monitoring and based on a real-time status of the attributes of the other available transfer channels and the first message, a second transfer channel of the other available transfer channels;

switching from the first transfer channel to the second transfer channel to ensure a successful transfer of funds; and transmitting, via the communication interface and via the second transfer channel, a second message indicating a second request to process the funds transfer, wherein the transaction control computing platform selects the second transfer channel based on a machine learning algorithm to determine one or more payment systems and intermediary accounts for the funds transfer and to determine at least one of wait times, expected usage costs, operation status, country based restrictions, and customer satisfaction scores associated with the second transfer channel, wherein the machine learning algorithm of the transaction control computing platform comprises an artificial neural network configured to execute the machine learning network to determine a real-time status of the attributes of each of the available transfer channels, wherein an artificial neural network obtains attribute information about the available transfer channels through a plurality of input nodes comprising logical inputs from different data sources, wherein a plurality of first output signals from the input nodes are processed by a plurality of processing nodes, wherein the processing nodes comprise a plurality of parallel processes executing on multiple computing devices, wherein each of the processing nodes may be connected to one or more other processing nodes, wherein the connections connect an output of one node to an input of another node, wherein the connection is correlated with a weighting value in which the output may be weighted as more important or significant than an output of another processing node, thereby influencing a degree of further processing as an input traverses across the artificial neural network, wherein the connections are modified by data feedback of correct or incorrect decisions such that the artificial neural network learns and is dynamically reconfigured as more inputs are processed, and wherein one or more second output signals from the plurality of processing nodes are processed by a plurality of output nodes to obtain attribute status information about the available transfer channels, wherein the output comprises at least one determined transfer channel(s), expected wait times, threshold queue lengths, threshold times, predicted expected handshake wait times, threshold customer satisfaction scores, confidence values, operation status of transfer channels, predicted expected usage costs, and classification output.

2. The method of claim 1, wherein the first message indicates at least one selected from:
a destination user account for the fund transfer;
an intermediary account for the fund transfer;
the first transfer channel;
a payment system associated with the first transfer channel;
origin currency associated with the fund transfer;
destination currency associated with the fund transfer;
a cut-off time associated with the fund transfer;
a value of the fund transfer; and
combination thereof.

3. The method of claim 2, further comprising determining, based on the first message, an expected wait time for completing the fund transfer over the first transfer channel, wherein the selecting the second transfer channel is based on determining that the expected wait time for completing the fund transfer over the first transfer channel exceeds the cut-off time.

4. One or more non-transitory computer-readable media for transferring funds from a payer to a payee based on a transmission of an electronic message from the payer to a financial institution associated with the payer and storing instructions that, when executed by a computing platform comprising at least one processor, a communication interface, and memory, cause the computing platform to:

receive, via the communication interface, a first message indicating a first request to process a fund transfer via a first transfer channel of a plurality of available transfer channels, the first message indicating a first request to process a funds transfer via a first transfer channel computing device in electronic communication with a transaction control computing platform, wherein the first transfer channel computing device is configured to transfer the funds based on the first request to a destination account of the payee maintained at a payee financial institution having a destination computing device in electronic communication with the first transfer channel computing device, wherein the first request comprises transaction details associated with the funds transfer including a transaction type, wherein the transaction type is associated with the first transfer channel and indicates that the first transfer channel of the plurality of available transfer channels is to be used for the funds transfer, wherein the first transfer channel comprises a system queue for storing one or more fund transfer requests which are processed in an order specified by the system queue, wherein the transaction control computing platform comprises a transaction analytics computing unit for monitoring funds transfer attributes associated with the plurality of available transfer channels and for storing determined attributes in a log file and periodically updating the log file based on the determined attributes and the monitoring, and wherein the funds transfer attributes are associated with at least one of a cost, timing and efficiency of transfer channels;

determine from the first request that the first transfer channel of the plurality of available transfer channels is to be used for processing the first request;

determine respective attributes of the other available transfer channels;
monitor a real-time status of the attributes of the first transfer channel to detect when the first transfer channel does not meet at least one criteria based on the first message;
select, in response to the monitoring and based on a real-time status of the attributes of the other available transfer channels and the first message, a second transfer channel of the other available transfer channels;
switch from the first transfer channel to the second transfer channel to ensure a successful transfer of funds; and
transmit, via the communication interface and via the second transfer channel, a second message indicating a second request to process the funds transfer, wherein the transaction control computing platform selects the second transfer channel based on a machine learning algorithm to determine one or more payment systems and intermediary accounts for the funds transfer and to determine at least one of wait times, expected usage costs, operation status, country based restrictions, and customer satisfaction scores associated with the second transfer channel,
wherein the machine learning algorithm of the transaction control computing platform comprises an artificial neural network configured to execute the machine learning network to determine a real-time status of the attributes of each of the available transfer channels,
wherein an artificial neural network obtains attribute information about the available transfer channels through a plurality of input nodes comprising logical inputs from different data sources,
wherein a plurality of first output signals from the input nodes are processed by a plurality of processing nodes, wherein the processing nodes comprise a plurality of parallel processes executing on multiple computing devices, wherein each of the processing nodes may be connected to one or more other processing nodes, wherein the connections connect an output of one node to an input of another node, wherein the connection is correlated with a weighting value in which the output may be weighted as more important or significant than an output of another processing node, thereby influencing a degree of further processing as an input traverses across the artificial neural network, wherein the connections are modified by data feedback of correct or incorrect decisions such that the artificial neural network learns and is dynamically reconfigured as more inputs are processed, and
wherein one or more second output signals from the plurality of processing nodes are processed by a plurality of output nodes to obtain attribute status information about the available transfer channels, wherein the output comprises at least one determined transfer channel(s), expected wait times, threshold queue lengths, threshold times, predicted expected handshake wait times, threshold customer satisfaction scores, confidence values, operation status of transfer channels, predicted expected usage costs, and classification output.

5. The one or more non-transitory computer-readable media of claim 4, wherein the first message indicates at least one selected from:
a destination user account for the fund transfer;
an intermediary account for the fund transfer;
the first transfer channel;
a payment system associated with the first transfer channel;
origin currency associated with the fund transfer;
destination currency associated with the fund transfer;
a cut-off time associated with the fund transfer;
a value of the fund transfer; and
combination thereof.

6. The one or more non-transitory computer-readable media of claim 5, storing instructions that, when executed by a computing platform further cause the computing platform to:
determine, based on the first message, an expected wait time for completing the fund transfer over the first transfer channel, wherein the selecting the second transfer channel is based on determining that the expected wait time for completing the fund transfer over the first transfer channel exceeds the cut-off time.

7. An apparatus for transferring funds from a payer to a payee based on a transmission of an electronic message from the payer to a financial institution associated with the payer, the apparatus comprising:
at least one processor;
a communication interface communicatively coupled to the at least one processor; and
a memory storing computer-readable instructions that, when executed by the at least one processor, cause the apparatus to:
receive, via the communication interface, a first message indicating a first request to process a fund transfer via a first transfer channel of a plurality of available transfer channels, the first message indicating a first request to process a funds transfer via a first transfer channel computing device in electronic communication with a transaction control computing platform, wherein the first transfer channel computing device is configured to transfer the funds based on the first request to a destination account of the payee maintained at a payee financial institution having a destination computing device in electronic communication with the first transfer channel computing device,
wherein the first request comprises transaction details associated with the funds transfer including a transaction type,
wherein the transaction type is associated with the first transfer channel and indicates that the first transfer channel of the plurality of available transfer channels is to be used for the funds transfer,
wherein the first transfer channel comprises a system queue for storing one or more fund transfer requests which are processed in an order specified by the system queue,
wherein the transaction control computing platform comprises a transaction analytics computing unit for monitoring funds transfer attributes associated with the plurality of available transfer channels and for storing determined attributes in a log file and periodically updating the log file based on the determined attributes and the monitoring, and
wherein the funds transfer attributes are associated with at least one of a cost, timing and efficiency of transfer channels;
determine from the first request that the first transfer channel of the plurality of available transfer channels is to be used for processing the first request;
determine respective attributes of the other available transfer channels;

monitor a real-time status of the attributes of the first transfer channel to detect when the first transfer channel does not meet at least one criteria based on the first message;

select, in response to the monitoring and based on a real-time status of the attributes of the other available transfer channels and the first message, a second transfer channel of the other available transfer channels;

switch from the first transfer channel to the second transfer channel to ensure a successful transfer of funds; and transmit, via the communication interface and via the second transfer channel, a second message indicating a second request to process the funds transfer, wherein the transaction control computing platform selects the second transfer channel based on a machine learning algorithm to determine one or more payment systems and intermediary accounts for the funds transfer and to determine at least one of wait times, expected usage costs, operation status, country based restrictions, and customer satisfaction scores associated with the second transfer channel, wherein the machine learning algorithm of the transaction control computing platform comprises an artificial neural network configured to execute the machine learning network to determine a real-time status of the attributes of each of the available transfer channels, wherein an artificial neural network obtains attribute information about the available transfer channels through a plurality of input nodes comprising logical inputs from different data sources, wherein a plurality of first output signals from the input nodes are processed by a plurality of processing nodes, wherein the processing nodes comprise a plurality of parallel processes executing on multiple computing devices, wherein each of the processing nodes may be connected to one or more other processing nodes, wherein the connections connect an output of one node to an input of another node, wherein the connection is correlated with a weighting value in which the output may be weighted as more important or significant than an output of another processing node, thereby influencing a degree of further processing as an input traverses across the artificial neural network, wherein the connections are modified by data feedback of correct or incorrect decisions such that the artificial neural network learns and is dynamically reconfigured as more inputs are processed, and wherein one or more second output signals from the plurality of processing nodes are processed by a plurality of output nodes to obtain attribute status information about the available transfer channels, wherein the output comprises at least one determined transfer channel(s), expected wait times, threshold queue lengths, threshold times, predicted expected handshake wait times, threshold customer satisfaction scores, confidence values, operation status of transfer channels, predicted expected usage costs, and classification output.

8. The apparatus of claim 7, wherein the first message indicates at least one selected from:
a destination user account for the fund transfer;
an intermediary account for the fund transfer;
the first transfer channel;
a payment system associated with the first transfer channel;
origin currency associated with the fund transfer;
destination currency associated with the fund transfer;
a cut-off time associated with the fund transfer;
a value of the fund transfer; and
combination thereof.

9. The apparatus of claim 8, wherein respective attributes of the available transfer channels comprise at least one selected from:
lengths of respective system queues;
respective usage costs;
respective average wait times for completing fund transfers;
respective average times for receiving handshake signals; and
combination thereof.

10. The apparatus of claim 9, further comprising determining, based on the first message and the respective attributes, an expected wait time for completing the fund transfer over the first transfer channel, and
wherein the selecting the second transfer channel is based on determining that the expected wait time for completing the fund transfer over the first transfer channel exceeds the cut-off time.

11. The apparatus of claim 9, wherein the selecting the second transfer channel is based on determining that a transaction input device has not received a handshake signal, responsive to the first message, from a first computing platform.

12. The apparatus of claim 9, wherein the selecting the second transfer channel is based on determining that a length of a system queue associated with the first transfer channel is greater than a threshold queue length.

13. The apparatus of claim 9, wherein the selecting the second transfer channel is based on determining that a difference between the cut-off time and an elapsed time following a transmission of the first message is within a threshold time.

14. The apparatus of claim 13, wherein the threshold time is determined based on an average time period between transmissions of prior messages indicating requests for fund transfers, to a first computing platform, and receptions of transfer confirmation messages from the first computing platform.

15. The apparatus of claim 9, wherein selecting the second transfer channel is based on determining that a first length of a first system queue associated with the first transfer channel is greater than a second length of a second system queue associated with the second transfer channel.

16. The apparatus of claim 9, wherein selecting the second transfer channel is based on determining that a first expected wait time for completing fund transfers over the first transfer channel is greater than a second expected time for completing fund transfers over the second transfer channel.

17. The apparatus of claim 7, wherein the first transfer channel comprises at least a first payment system and a second payment system, wherein the first payment system comprises a second computing platform, wherein the second payment system comprises a third computing platform, and wherein the computer-readable instructions, when executed by the at least one processor, cause the transaction control computing platform to:
transmit, via the communication interface to the third computing platform, a third message indicating a third request to process the fund transfer, wherein the selecting the second transfer channel is based on determining that the transaction control computing platform has not received, from the third computing platform, a handshake signal responsive to the third message.

18. The apparatus of claim 7, wherein the second transfer channel is associated with a higher tier service level than the first transfer channel.

19. The apparatus of claim 7, wherein the selecting the second transfer channel of the available transfer channels comprises:
- determining a subset of transfer channels among the available transfer channels;
- sending, via the communication interface and to a third computing platform, a third message indicating the subset of transfer channels; and
- receiving a fourth message indicating the second transfer channel.

20. The apparatus of claim 7, wherein the computer-readable instructions, when executed by the at least one processor, cause the transaction control computing platform to transmit, via the communication interface and to a first computing platform, a third message indicating a request to cancel the first request.

21. The apparatus of claim 7, wherein the artificial neural network comprises a feedback system and wherein the feedback system provides one or more third output signals from at least one set of output nodes to at least one input node.

\* \* \* \* \*